United States Patent Office 2,881,055
Patented Apr. 7, 1959

2,881,055

CONTROL METHODS FOR FUSED BATHS

Reginald S. Dean, Hyattsville, and Leroy D. Resnick, Silver Spring, Md., assignors to Chicago Development Corporation, Riverdale, Md., a corporation of Delaware No Drawing. Application August 20, 1956
Serial No. 605,231

3 Claims. (Cl. 23—230)

This invention relates to control methods for fused baths for the production of metal crystals. It has for its object the control of the composition of such baths for the production of metal such as titanium, zirconium, chromium and vanadium by the reaction of solutions of alkalinous metals in fused chlorides of alkalinous metals with compositions in the system $$M - \frac{Br}{Cl} - \text{alkalinous metal}$$

We have found that the behavior of compositions in the ternary system Ti-Cl-alkalinous metal when subjected to addition of titanium chloride or a solution of alkalinous metal is determined by three parameters as follows; the total titanium content soluble in dilute acid, the average valence of the soluble titanium as determined by reducing power for ferric sulphate solution, and the hydrogen evolution of the composition when dissolved in slightly acidified ferric sulphate solution.

We conceive of the compositions in the system Ti-Cl-alkalinous metal which are subject to the control method of our invention as containing, when solid alkalinous metal chloride, a mixture of $TiCl_3$ and $TiCl_2$ and free metallic alkalinous metal. Our control method, e.g., determines the relative percentage of these by determining total soluble titanium by any standard method, and likewise the total reducing power for ferric sulphate solution by standard methods. The determination of the third parameter, hydrogen evolution in acidified ferric sulphate solution, has not to our knowledge been previously used as a control method. We conceive this procedure to determine free alkalinous metal, but in any case the combination of the three parameters constitutes our invention.

There are several ways of carrying out our invention. A preferred procedure is as follows: We take 1 gram of the solidified bath and place it in a fermentation tube containing 10% $Fe_2(SO_4)_3 \cdot 9H_2O$ and 6% sulphuric acid (sp. gr. 1.84). The fermentation tube is provided with an argon atmosphere. The volume of gas evolved is determined when all the salt has dissolved. We then transfer the contents of the fermentation tube to an argon filled flask, filtering if necessary to obtain a clear solution, and titrate with standard permanganate 0.1 normal. The pink solution after titration is put through a Jones reductor and into a flask with a hydrogen atmosphere. The reduced solution is titrated with standard ferric sulphate solution 0.1 N using ammonium thiocyanate as an indicator in the standard fashion. This procedure determines total soluble titanium. We now have three values, (1) Hydrogen evolved per gram
(2) Total soluble titanium
(3) Reducing power of the titanium to ferric sulphate We find it convenient for control purposes to calculate the average valence of titanium by the formula $$4 - \frac{\text{ml standard permanganate}}{\text{ml standard ferric sulphate}}$$

This provides then the three parameters of our invention. It will be obvious to analysts that total soluble titanium can be determined by other means such as solution in sulphuric acid in an inert atmosphere and titration with standard dichromate. Total reducing power to ferric salts can also be determined by dissolving in ferric chloride and titrating with standard dichromate. These titrations provide average valence and total soluble titanium. Total gas evolution in sulphuric acid or hydrochloric acid provides a third value which is the sum of the hydrogen evolved from $TiCl_2$ and free alkalinous metal. This value in $H_2$ evolved per gram can be converted to the parameter of our invention by subtracting the hydrogen per gram evolved due to $TiCl_2$ which can be calculated by multiplying percent soluble titanium by 10 (Mg.Ti per gram) and by 11.2 (volume of gas due to 1 $Mg.H_2$) and by 3 minus the average titanium valence divided by 47.9 (atomic weight of titanium).

The essential novelty of our analytical procedure resides in the use of acidified ferric sulphate solution to determine the reducing power of lower valent titanium in the presence of free sodium. We have found that free alkalinous metals, including sodium, potassium, lithium, calcium, barium and strontium, do not reduce acidified ferric sulphate.

Other oxidizing solutions can be used in place of acidified ferric salts provided they oxidize titanium chlorides to titanic salts and are not reduced by metallic sodium. An acid solution of dichromate may be used, but gives less reliable results than ferric sulphate. Under certain conditions dichromate is partially reduced by sodium.

Our control method is particularly valuable in the control of electrolytic cell baths as disclosed, for example, in the co-pending application of R. S. Dean (with W. W. Gullett), Serial No. 601,705, filed August 2, 1956.

It is also useful for the control of baths which are used for the chemical or electroplating of objects with titanium.

We have described our control method as it applies to compositions containing titanium. It is also applicable to other metals which have more than one valence and forming at least two chlorides or bromides soluble in molten alkalinous chlorides or bromides and which metals are more electropositive than iron. Such compositions are disclosed in R. S. Dean's co-pending application, Serial No. 605,232, filed August 20, 1956.

Our method is applicable to bromides only if the bromide ion is removed in the ferric sulphate solution steps by the addition of an excess of silver sulphate.

What is claimed is:

1. In a single-phase fused bath composition having as components in the phase rule sense (a) a metal selected from the group consisting of titanium, zirconium, hafnium, chromium and vanadium, (b) chlorine and (c) at least one metal selected from the group consisting of alkali and alkaline earth metals, the method of establishing the magnitude of said parameters (a), (b) and (c) which consists in cooling the bath rapidly and determining in the solid mass the percent of total metal of the first group present as water-soluble chloride, the average valence of the metal in said chloride toward an oxidizing agent not reduced by the metal of the second group, and the content of said second group metal as established by hydrogen evolution in acid above hydrogen evolution due to the lower valent salt of the metal of the first group above.

2. The method of claim 1 further characterized in that hydrogen evolution above that due to divalent metal is determined by dissolving a known weight of salt in an acidified ferric salt solution and measuring the hydrogen evolved.

3. The method of claim 1 further characterized in that the oxidizing agent for determining metal valence is an acidified ferric salt solution.

References Cited in the file of this patent

UNITED STATES PATENTS 2,817,631   Gullett _____ Dec. 24, 1957